Sept. 20, 1949.  F. P. GRUTZNER  2,482,168
VEHICLE TRUCK AND BODY INTERLOCK
Filed Feb. 19, 1947  2 Sheets-Sheet 1

INVENTOR
FRITZ PAUL GRUTZNER
BY
ATTORNEY

Sept. 20, 1949.    F. P. GRUTZNER    2,482,168
VEHICLE TRUCK AND BODY INTERLOCK
Filed Feb. 19, 1947    2 Sheets-Sheet 2

INVENTOR
FRITZ PAUL GRUTZNER
BY Paul L. Krohn
ATTORNEY

Patented Sept. 20, 1949

2,482,168

UNITED STATES PATENT OFFICE 2,482,168

VEHICLE TRUCK AND BODY INTERLOCK

Fritz Paul Grutzner, Beloit, Wis., assignor to Fairbanks, Morse & Co., Chicago, Ill., a corporation of Illinois Application February 19, 1947, Serial No. 729,651

9 Claims. (Cl. 105—200)

1

This invention relates generally to railway vehicles, and has particular reference to improved interlock means for preventing accidental separation of the vehicle body from the wheel trucks.

In certain instances of railway vehicle construction, as in the case of vehicles employing six wheel trucks wherein the center axle of the truck relatively closely underlies the pivotal connection of the vehicle body and truck, and particularly where the vehicle is a powered unit having power or other operating equipment over the center of the pivotal truck connection, it is difficult if not impossible because of space requirements and the general inaccessibility of the truck body pivotal connection, to apply a king pin in the zone of the truck-body connection as such is utilized generally in other types of railway vehicles, for the prevention of accidental truck and body separation. Accordingly, it is the principal object of this invention to provide truck and body interlock means of a relatively simple yet highly effective character, which may be readily and conveniently installed, and further, which is readily controllable from the exterior of the vehicle, to position the same for truck and body interlock against accidental separation thereof, and to effect when desired, retraction of the interlock without removal of its parts from the vehicle, whereby to disconnect the truck and body such as to permit, for example, substitution of truck or vehicle body structures.

Additional objects and advantages of the invention will appear from the following description of a presently preferred embodiment thereof as such as illustrated by the accompanying drawings, wherein:

Fig. 4 is an enlarged fragmentary sectional view in the region of one of the interlock devices;

Fig. 5 is a fragmentary view as apears from the line 5—5 in Fig. 4;

Fig. 6 is a fragmentary section showing the mounting of the interlock on the body bolster;

2

Fig. 7 is a fragmentary top plan view at the interlock device, as taken from line 7—7 in Fig. 6, and Fig. 8 illustrates in perspective, the interlock member and a retainer element for the interlock control rod shown in Fig. 4.

Figure 1:
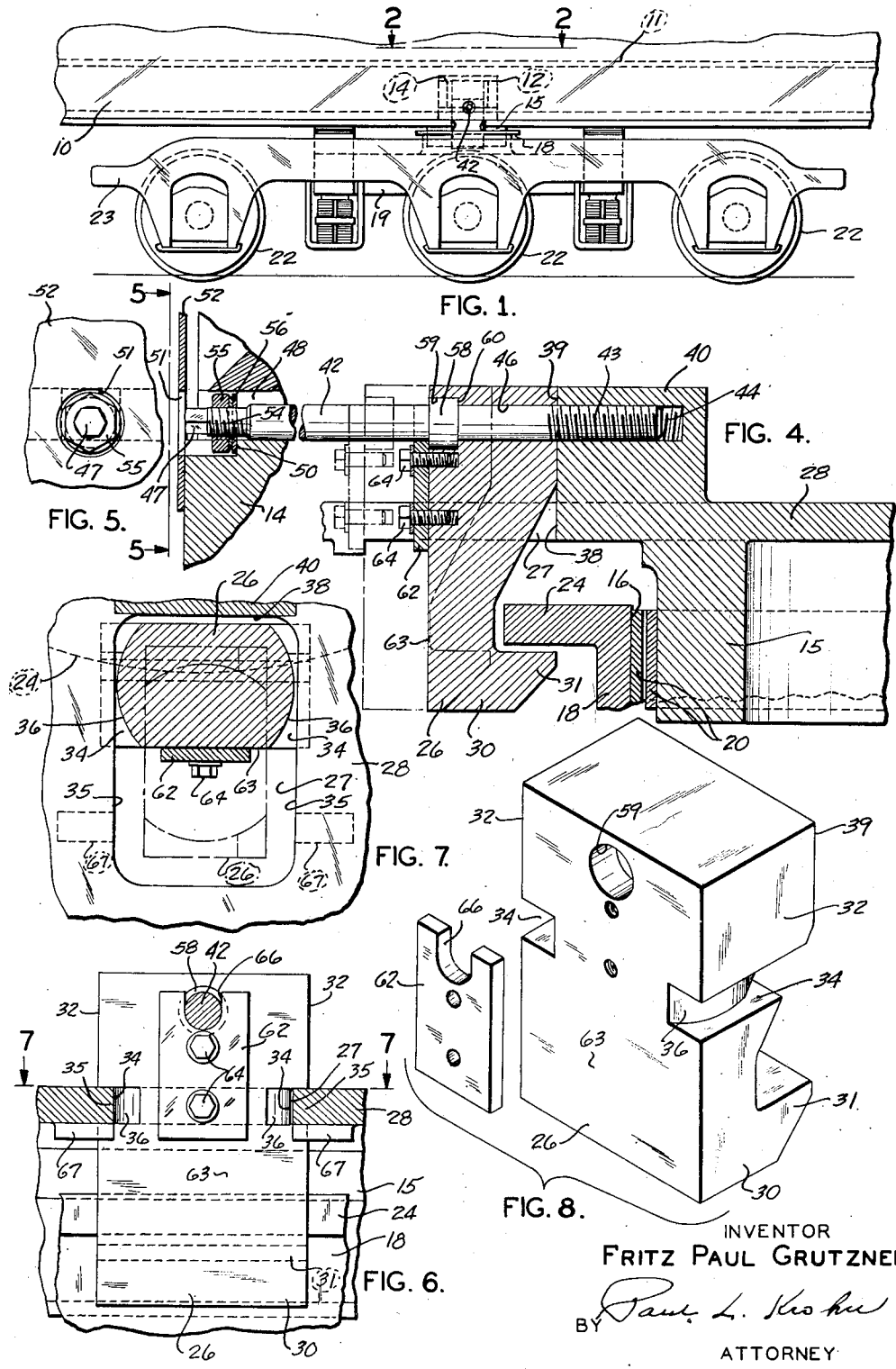
Fig. 1 shows in side elevation, a six wheel truck below a vehicle body shown in fragmentary side elevation, to which is applied the interlock means of this invention.
Figure 2:
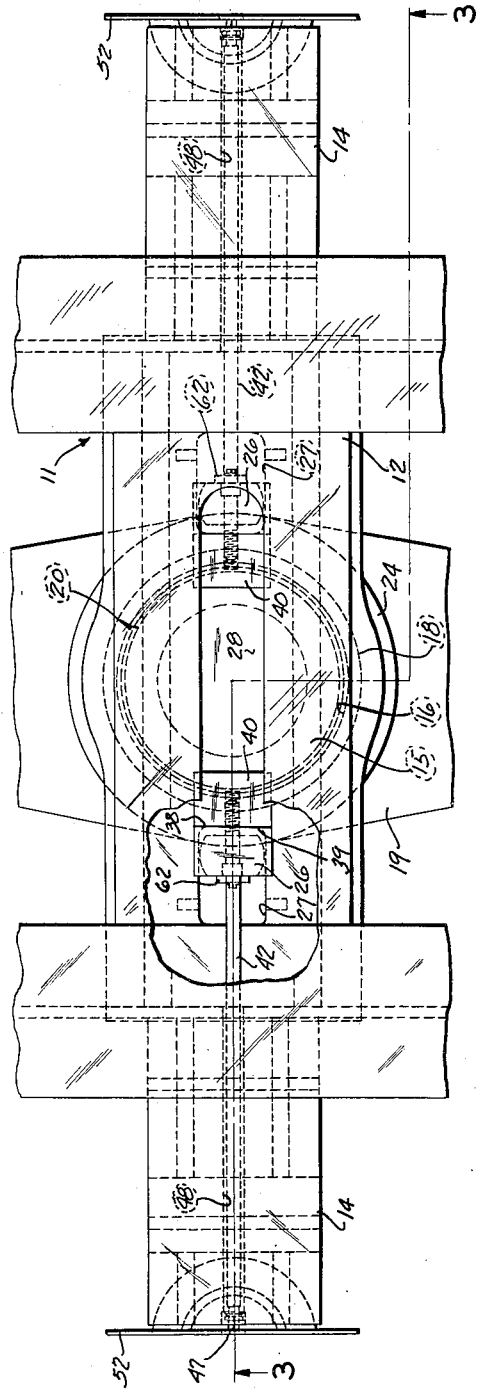
Fig. 2 is an enlarged fragmentary top plan view of the pivotally connected body and truck bolsters showing the interlock means, the view being taken on the line 2—2 of Fig. 1.

Referring to the drawings, there is provided on the under side of a railway vehicle body indicated generally at 10, a body bolster structure 11 (Figs. 2 and 3, and shown in broken lines in Fig. 1) including a center frame 12 and opposite side frames 14. Depending centrally from the center frame 12 is a circular bearing member 15 adapted for reception in a circular recess 16 provided by an annular member 18 centrally upstanding on the truck bolster indicated in part at 19 in Fig. 3, the members 15 and 18 thus cooperating through annular wear elements 20, to afford a pivotal connection of the truck and vehicle body. The truck assembly shown is of the six wheel type, providing the wheels 22 on the axles (not shown) suitably journalled on the truck frame 23.

While the members 15 and 18 provide an effective pivotal connection of the truck and vehicle body, and serve to limit relative lateral movements thereof, these members without more, will not prevent relative separating displacements of the truck and body in the vertical direction. It is the purpose, therefore, of this invention, to afford effective and controllable interlocking means for limiting vertical separating movements of the truck and body such as will preclude any accidental complete separation of the body from the truck. In the present example, the member 18 of the truck bolster is formed to provide a peripherally outstanding horizontal flange 24, and provided for cooperation with the flange to prevent vertical separation of the truck and body, are interlock members 26, one on each side of the pivotal connection of the truck and body bolsters. Since the interlocks are substantially identical in form and operative mounting arrangement on the body bolster 11, only one thereof will be described in detail, with the corresponding parts of both however, bearing the same reference characters.

The center frame 12 of the body bolster 11 is provided with a generally rectangular opening 27 through the horizontal bottom frame plate 28, the opening being located laterally adjacent the pivot bearing member 15 and having its major axis directed transversely of the vehicle body. Arranged vertically through the opening is the interlock member 26, the member being of generally block shape (Fig. 8) and formed in its lower portion, to provide a lower hook-like end 30, with the hook portion 31 extending the width of the member. In each side 32 of the member is a recess 34 adapted to receive therein one of the longitudinal margins 35 of the opening 27, the member thus being supported on the plate 28 and movable along the opening for a purpose to appear. Assembly of the member in the opening is here accomplished by positioning the member at a right angle to its normal mounted position, inserting the same vertically through the opening with its hook end lowermost, and then turning the member such as to receive the opening margins 35 in the block recesses 34 (Fig. 6). In order to facilitate block turning in the opening, as to its assembly position with the hook end 30 toward the flange 24 on the truck bolster, each of the block recesses 34 has its bottom surface 36 rounded as shown in Fig. 8.

Figure 3:
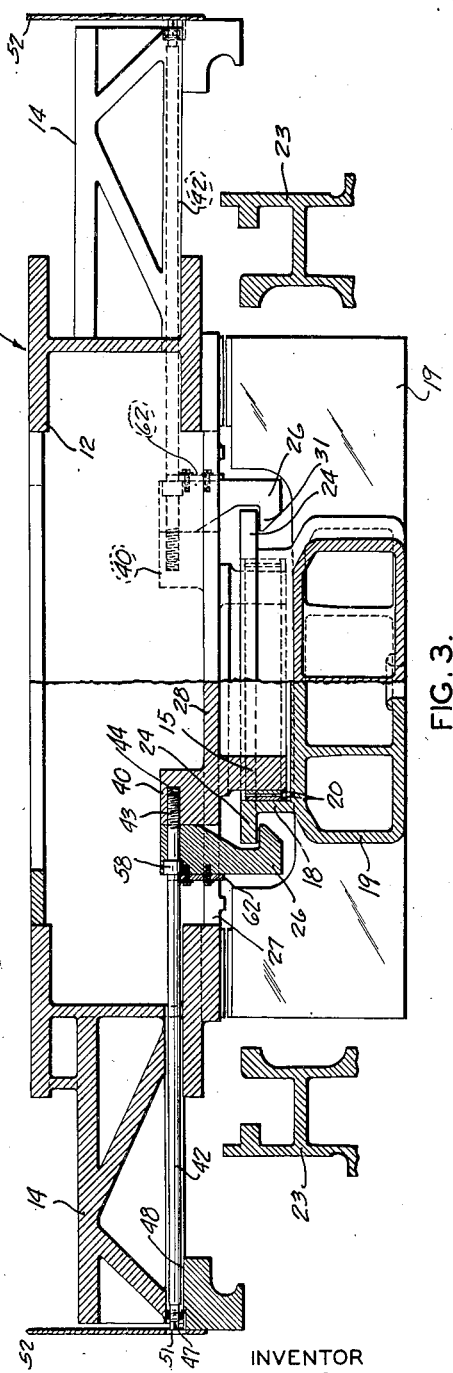
Fig. 3 is a vertical transverse section taken on the line 3—3 in Fig. 2.

As appears particularly from Figs. 3 and 4, displacement of the interlock member toward the inner end 38 of opening 27, serves to bring the hook end 30 into operative relation with the flange 24, wherein the hook 31 underlies the flange. Retention of the interlock in this position, effected by means presently to be described, thus conditions the interlock member and flange 24 for cooperation to limit in a positive manner, vertical separating movements of the truck and body bolsters, since upon movement of the vehicle body assembly including the bolster 11, upwardly from the truck, the interlock hook end 31 will engage the truck bolster flange 24. Consequently, accidental vertical separation of the vehicle body from the truck is thereby precluded. In normal vehicle operation, however, the hook end 31 of the interlock member clears the peripheral surface and underside of the flange 24 sufficiently to avoid any interference with the relative pivotal movements of the truck and body bolsters.

The effective or operative position of the interlock member at the inner end 38 of the opening 27 (Figs. 3 and 4), is determined by abutment of the face 39 of the member with a lug 40 upstanding on the body bolster plate 28. Cooperating with the interlock member and the lug 40 is a control device now to be described, which is operable to retain the interlock member in its effective position against the lug 40, and to retract the member along the opening 27 to a position clearing the hook end 31 with respect to the truck flange 24, whereby to permit separation of the truck and vehicle body as when it is desired to change trucks or body assemblies, or for any other purpose.

The control device according to the present improvements, comprises a control rod 42 having its inner end 43 threadedly received in a threaded bore 44 in the lug 40, the rod extending horizontally through a bore 46 in the interlock member 26 and thence outwardly through the side frame 14 of the body bolster 11, terminating in a hexagonal end 47 in a recess 48 provided in the frame 14. The recess 48 provides an internal shoulder 50 and is open to the side of the bolster and vehicle body through an opening 51 in the body side plate indicated at 52. The hexagonal end 47 of the rod thus presented for ready access externally of the vehicle at the side thereof, affords the application thereto of a suitable tool such as a socket wrench (not shown) for turning the rod to thread its inner end 43 inwardly or outwardly of the lug bore 44, with corresponding axial displacement of the rod. The rod further is threaded at 54 adjacent the outer end 47 thereof, to receive a lock nut 55 which following operation of the rod to move the interlock member to its effective position (through means presently to appear, is turned to bear through a washer 56, against the recess shoulder 50, whereby to lock the parts in position.

Inwardly of its threaded end 43, the rod 42 is provided with a circumferentially outstanding shoulder or flange element 58 which is received in the larger diameter portion 59 of the bore 46 in the interlock member 26, the flange element abutting the internal shoulder 60 between the bore portions of different diameter, and being retained therein by a keeper plate 62 removably secured to the rear face 63 of the member 26, as by screws or studs 64. The keeper plate is arcuately recessed in its upper end portion, as at 66, to embrace the rod and overlie the adjacent side face of the rod flange 58 as shown in Figs. 4 and 6. Thus while the rod is free to turn in the bore 46 of the interlock member, the latter is constrained through the rod flange confined between the bore shoulder 60 and the keeper plate 62, to follow or move with the rod in its longitudinal or axial displacements consequent upon rod rotation.

From the foregoing it will be now observed that upon assembly of the interlock parts as described, turning of the control rod 42 in the direction to thread its end 43 inwardly of the threaded bore 44 of the lug 40, will effect follower movement of the interlock member 26 along the opening 27 toward and into abutment of its face 39 with the lug 40. The interlock member thus disposed in its operative position wherein the hook end 31 thereof underlies the truck bolster flange 24, then may be locked in such position by locking the control through the lock nut 55. Now when it is desired to release the interlock connection to permit separation of the vehicle body and truck, as for repair or substitution of the body or truck, the rod lock nut 55 is first released and then through the application of a socket wrench to the rod end 47, the rod is turned in the direction to unthread its inner end outwardly relative to the lug 40. This causes the interlock member 26 to be retracted from its operative position, until the member abuts suitable stop projections 67 on the body bolster plate 28. In its retracted position as determined by the stops 67, the member 26 will have its hook end 31 disposed to clear the truck flange 24, thus rendering the interlock ineffective.

It is to be noted as an important feature of the present improvements, that once the interlock mechanism is installed, it is readily controlled as to the effective or ineffective position of the interlock member 26, from the exterior of the vehicle body at one side thereof in the manner hereinbefore described. In consequence thereof, there is thus avoided any requirement or necessity of provisions for direct access to the interlock members 26 either from within the body or therebelow, which it is to be noted, would be most difficult to provide in the instance of vehicles provided with six wheel trucks having the center axle below the bolster pivotal connection, and wherein operating mechanism may be mounted in the body in overlying position with respect to the interlocks.

Having now illustrated and described a presently preferred embodiment of the invention, it is to be understood that alterations and modifica-

I claim:

1. In combination, a vehicle body bolster, a wheel truck bolster therebelow and pivotally connected with the body bolster, an interlock member movably supported on one of said bolsters for movement to and from an operative position, a projection on the other of said bolsters, said member being adapted for cooperation with said projection on the other of said bolsters when the member is in said operative position, to prevent vertical separation of the bolsters, and control means including an actuating element operatively connected to said member and accessible for actuation from the exterior of one of said bolsters at one side thereof, for moving said member to and from said operative position.

2. In combination, a vehicle body bolster structure, a wheel truck structure below and pivotally connected to the bolster structure, a projection on said truck structure, a member slidably carried by one of said structures and adapted for cooperation with said projection on said truck structure when slidably displaced to an operative position, to prevent vertical separation of the structures, and a control element carried by one of said structures and engaging said member, operable from the exterior of the structure at one side thereof, for sliding said member to and from said operative position of the member.

3. In combination, a vehicle body bolster having an aperture therein open to the underside of the bolster, a wheel truck pivotally connected to the bolster, a projection on said truck, a member positioned through said aperture and movably supported therein, adapted for cooperation with said projection of the truck to prevent vertical separation of the truck and bolster, and means including a control rod operatively connected with said member for moving the latter to and from a position of cooperation with said projection of the truck.

4. In combination, a vehicle body bolster having an aperture therein open to the underside of the bolster, a wheel truck below and pivotally connected to the bolster, a projection on said truck, a member arranged through said aperture and adapted for cooperation with said projection of the truck to prevent vertical separation of the truck and bolster, means supporting said member for movement in said aperture to and from a position of cooperation thereof with said projection of the truck, and means connected to said member and operable from the exterior of said bolster at one side thereof, for moving said member selectively to or from said position.

5. In combination, a vehicle body bolster having an aperture therein open to the underside of the bolster, a wheel truck below and pivotally connected to the bolster, a flange on said truck below said aperture, a member extending through said aperture and adapted at its lower end for projection beneath said truck flange, means supporting said member for movement in said aperture to and from an operative position wherein said lower end of the member projects beneath said flange, the member in said operative position cooperating with the flange to prevent vertical separation of the truck and body bolster, and means engaging said member and effective to retain the latter in said operative position, said last means being operable from the exterior of the body bolster at one side thereof, for moving said member from said operative position, whereby to permit truck and bolster separation.

6. In combination, a vehicle body bolster structure, a wheel truck structure pivotally connected to the bolster structure, one of said structures having a flange thereon, a member movably supported on the other structure and providing an end portion adapted for cooperation with said flange in one position of the member, to prevent vertical separation of the truck and body bolster structures, and an element engaging said member and effective to retain the latter in said position, said element being operatively carried by one of said structures and accessible from the exterior of the latter at one side thereof, for actuation to retract said member from said position, whereby to permit separation of the truck and bolster structures.

7. In combination, a vehicle body bolster structure, a wheel truck structure pivotally connected to the bolster structure, one of said structures having a guideway therein, the other structure providing a flange extending adjacent said guideway, a member slidable in said guideway and projecting therefrom, in the direction of said flange, the projecting portion of the member terminating in a hook-end adapted for cooperation with said flange in an operative position of the member in said guideway, to prevent vertical separation of the truck and bolster structures, and means for releasably retaining said member in said operative position, said means including an element connected to the member and accessible from the exterior of one of said structures at one side thereof, effective upon operation of the element, to slide the member in said guideway to or from said operative position of the member.

8. In combination, a vehicle body bolster having a guideway therein open to the underside of the bolster, a truck bolster below and pivotally connected to the body bolster, said truck bolster including a flange extending adjacently below said guideway, a member slidably supported in said guideway and providing a hook-like lower end adapted for cooperation with said flange in one position of the member along said guideway, to limit vertical separating movement of the body bolster relative to the truck bolster, and means for sliding said member along said guideway to and from said position of the member and for retaining the member in said position, said means including an operating element extending laterally of the body bolster and accessible from the exterior of the latter, for actuation thereof.

9. In combination, a vehicle body bolster having a central depending member, a wheel truck bolster, means on said truck bolster adapted to receive said member for effecting pivotal connection of the bolsters, said means providing a flange extending laterally therefrom, the body bolster having an elongate slot therein, a bolster interlock member arranged through said slot and having recesses in the opposite sides thereof, receiving the longitudinal side margins of the slot to provide an operative support of the member for displacement along the slot, said interlock member having its lower end portion formed to provide a hook-like end adapted for underlying cooperation with said flange upon displacement of the member to a position near one end of said slot, to limit vertical separation of the truck and body bolsters, a control element operatively carried by the body bolster and accessible for actuation thereof from the exterior of the body bolster at one side of the latter, and means operatively connecting said interlock member and control element for effecting displacement of the interlock member along said slot upon actuation of the control element.

FRITZ PAUL GRUTZNER.

REFERENCES CITED

The following references are of record in the file of this patent:

UNITED STATES PATENTS

| Number | Name | Date |
|---|---|---|
| 1,868,530 | Harley et al. | July 26, 1932 |
| 1,912,563 | Allison | June 6, 1933 |
| 2,249,467 | Finch | July 15, 1941 |

FOREIGN PATENTS

| Number | Country | Date |
|---|---|---|
| 284,090 | England | Jan. 26, 1928 |